United States Patent
Sumi et al.

(10) Patent No.: US 11,478,840 B2
(45) Date of Patent: Oct. 25, 2022

(54) MANUFACTURING METHOD OF WIRE ROD, MANUFACTURING APPARATUS OF WIRE ROD, WIRE ROD, AND MOTOR

(71) Applicant: NIDEC CORPORATION, Kyoto (JP)

(72) Inventors: Shigeharu Sumi, Kyoto (JP); Shigeru Maeda, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 370 days.

(21) Appl. No.: 16/626,926

(22) PCT Filed: Jun. 12, 2018

(86) PCT No.: PCT/JP2018/022316
§ 371 (c)(1),
(2) Date: Dec. 27, 2019

(87) PCT Pub. No.: WO2019/064713
PCT Pub. Date: Apr. 4, 2019

(65) Prior Publication Data
US 2020/0139423 A1 May 7, 2020

(30) Foreign Application Priority Data
Sep. 28, 2017 (JP) .............................. JP2017-188053

(51) Int. Cl.
*B21F 5/00* (2006.01)
*B21J 5/08* (2006.01)
(Continued)

(52) U.S. Cl.
CPC ................... *B21F 5/00* (2013.01); *B21J 5/08* (2013.01); *H02K 1/16* (2013.01); *H02K 3/12* (2013.01); *H02K 15/045* (2013.01)

(58) Field of Classification Search
CPC ............ H02K 15/04; H02K 1/16; H02K 3/12; H02K 15/045; B21F 5/00; B21J 5/08; B21C 1/00
(Continued)

(56) References Cited

U.S. PATENT DOCUMENTS 6,710,496 B2 * 3/2004 Fujita ................. H02K 15/0478
310/201
6,971,153 B2 * 12/2005 Tokizawa ........... H02K 15/0421
29/733
(Continued)

FOREIGN PATENT DOCUMENTS

JP H9-168261 A 6/1997
JP 3652348 B2 5/2005
(Continued)

OTHER PUBLICATIONS

English Machine translation, JP 09-168261 (Year: 1997).*
English machine translation, JP2007-185698 (Year: 2007).*
English machine translation, JP 2006-14530 (Year: 2006).*

*Primary Examiner* — Burton S Mullins
(74) *Attorney, Agent, or Firm* — Hauptman Ham, LLP

(57) ABSTRACT

Provided is a manufacturing method of a wire rod for forming a coil, the manufacturing method including the steps of: placing an element wire in a forming space surrounded by a plurality of split dies; and pressure-forming the element wire by moving the plurality of split dies in a direction of narrowing the forming space. In the step of pressure-forming the element wire, at least one of the plurality of split dies is moved, and the plurality of split dies each having a surface that changes in shape in a longitudinal direction of an element wire to pressure-form the element wire into the wire rod having a plurality of different cross-sectional shapes in the longitudinal direction.

14 Claims, 6 Drawing Sheets

(51) Int. Cl.
*H02K 15/04* (2006.01)
*H02K 1/16* (2006.01)
*H02K 3/12* (2006.01)

(58) Field of Classification Search
USPC .......................... 72/381, 383–384, 394, 399
See application file for complete search history.

(56) References Cited

U.S. PATENT DOCUMENTS

| | | | |
|---|---|---|---|
| 7,928,626 B2 * | 4/2011 | Kamibayashi | H02K 3/12 |
| | | | 310/201 |
| 10,170,952 B2 * | 1/2019 | Egashira | H02K 15/045 |
| 2009/0102309 A1 | 4/2009 | Kamibayashi et al. | |

FOREIGN PATENT DOCUMENTS

| | | | | |
|---|---|---|---|---|
| JP | 2006-14530 A | | 1/2006 | |
| JP | 2007-185698 | * | 7/2007 | ............... B21C 3/02 |

* cited by examiner

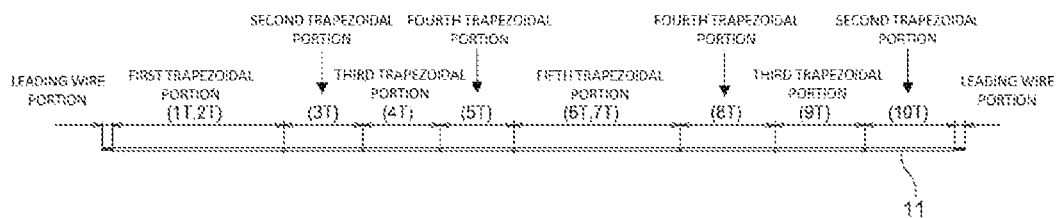
Fig. 3A
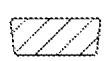 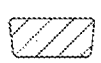 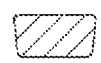  
Fig. 3B　　Fig. 3C　　Fig. 3D　　Fig. 3E　　Fig. 3F
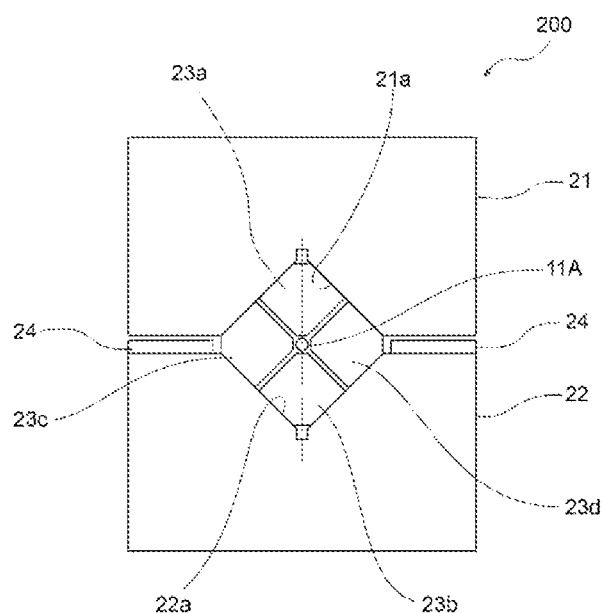
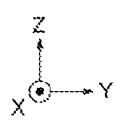
Fig. 4

MANUFACTURING METHOD OF WIRE ROD, MANUFACTURING APPARATUS OF WIRE ROD, WIRE ROD, AND MOTOR

CROSS-REFERENCE TO RELATED APPLICATIONS

This is the U.S. national stage of application No. PCT/JP2018/022316 filed on Jun. 12, 2018, and priority under 35 U.S.C. § 119(a) and 35 U.S.C. § 365(b) is claimed from Japanese Application No. 2017-188053 filed on Sep. 28, 2017.

FIELD OF THE INVENTION

The present invention relates to a manufacturing method of a wire rod, a manufacturing apparatus of a wire rod, a wire rod, and a motor.

BACKGROUND

In recent years, miniaturization and high output of motors have been demanded. To achieve miniaturization and high output of a motor, torque density of the motor needs to be improved. Then, to improve the torque density of a motor, it is effective to increase a space factor of a coil in a stator slot. The space factor is a ratio of a total sectional area of a coil disposed in a slot to a sectional area of the slot of a stator of the motor.

An aspect of using a wire rod (conductive wire) having a trapezoidal cross-sectional shape to increase a space factor of a coil has been known. The wire rod has a different trapezoidal cross-sectional shape for each area corresponding to one turn of the coil. Hereinafter, the wire having a plurality of trapezoidal cross sections different in dimension is referred to as a "composite trapezoidal wire". As a method for manufacturing a composite trapezoidal wire, an aspect of performing roll forming using four forming rollers each movable in a direction perpendicular to a rotation axis while an interval between the forming rollers is changed, has been known.

SUMMARY

Unfortunately, the technique described above requires change in position of each forming roller during manufacturing of one conducting wire, so that a tact time increases to deteriorate productivity.

Then, it is an object of the present invention to provide a manufacturing method of a wire rod, capable of manufacturing a wire rod having several different cross-sectional shapes in a longitudinal direction with high accuracy and at a higher speed, and a wire rod obtained by the manufacturing method.

To solve the above-described problem, a manufacturing method of a wire rod according to an aspect of the present invention is configured to manufacture a wire rod for forming a coil, the manufacturing method including the steps of: placing an element wire in a forming space surrounded by a plurality of split dies; and pressure-forming the element wire by moving the plurality of split dies in a direction of narrowing the forming space, and in the step of pressure-forming, at least one of the plurality of split dies is moved, the plurality of split dies each having a surface that changes in shape in a longitudinal direction of the element wire to pressure-form the element wire into a wire rod having a plurality of different cross-sectional shapes in the longitudinal direction.

A manufacturing apparatus of a wire rod, according to another aspect of the present invention is configured to manufacture a wire rod for forming a coil, the manufacturing apparatus including: a plurality of split dies disposed forming a forming space in which an element wire is disposed; and a moving mechanism that moves at least one of the plurality of split dies in a direction of narrowing the forming space, the plurality of split dies each having a contact surface with the element wire, the contact surface having a shape that changes in a longitudinal direction of the element wire.

A wire rod according to yet another aspect of the present invention is manufactured by the above-described manufacturing method of a wire, the wire rod including a plurality of winding-corresponding regions corresponding to a length of one turn of the coil, the plurality of winding-corresponding regions each including a first region having a trapezoidal cross section, the trapezoidal shape in the first region being different in dimension for each of the plurality of winding-corresponding regions.

A motor according to yet another aspect of the present invention includes a shaft centered on a central axis extending in a predetermined direction, a rotor fixed to the shaft, and a stator, the stator including: an annular core back; a tooth projecting radially from the core back; and a coil wound around the tooth, the coil being formed of the wire rod.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIGS. 3A to 3F illustrate examples of a wire rod constituting a coil;

FIG. 4 is a diagram illustrating structure of a forming apparatus before a wire rod is processed;

DETAILED DESCRIPTION

Hereinafter, embodiments of the present invention will be described with reference to the drawings. The scope of the present invention is not limited to the embodiments described below, and can be arbitrarily changed within a range of technical ideas of the present invention. In the following drawings, each structure may be different in contraction scale, number, or the like from an actual structure for easy understanding.

Figure 1:
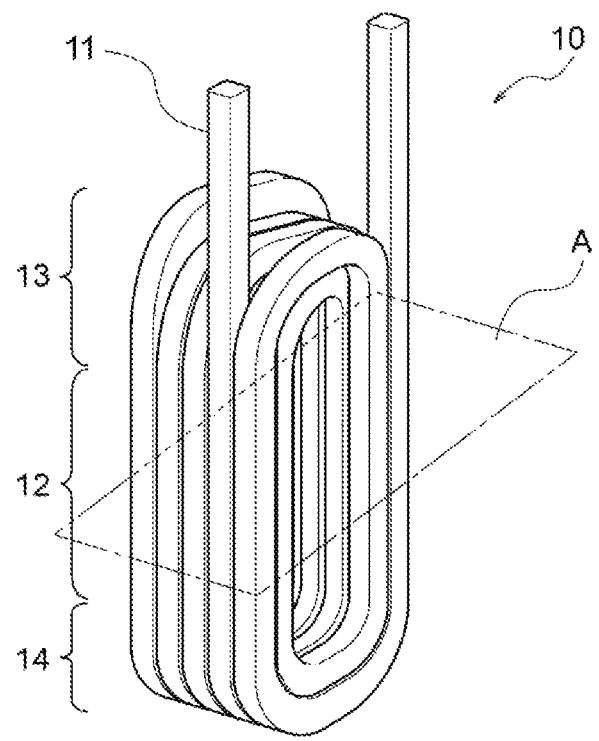
FIG. 1 illustrates a configuration example of a coil according to the present embodiment.

FIG. 1 is a perspective view illustrating an example of structure of a coil 10 according to the present embodiment. The coil 10 is formed by winding a wire rod (linear conducting wire) 11. The coil 10 is a stator coil used for a motor that rotates about a central axis extending in a predetermined direction. Here, the motor can be mounted on an object to be mounted in each field such as an automobile, an electric automobile, electric assist equipment, an electric airplane, a movable body such as a multicopter, industrial equipment such as a robot, an information recording/reproducing device that rotates an information recording medium, a home appliance, office equipment, or medical equipment. While in the present specification, the direction of the central axis of the motor will be described as the vertical direction for convenience, a posture during use of the motor is not limited. In addition, the direction of the central axis of the motor is simply referred to as "axial direction", and the radial direction and the circumferential direction around the central axis are simply referred to as "radial direction" and "circumferential direction".

The coil 10 according to the present embodiment is formed by a method of winding one conducting wire 11 in one direction to form multiple layers and multiple rows, and drawing a lead wire to the outermost periphery. In the present embodiment, there will be described the coil 10 configured such that the conducting wire 11 is wound forming two layers and five rows (2×5=10 turns), and ends of the conducting wire 11 are drawn from an outer periphery of a first row and an outer periphery of a second row. The coil 10 includes a slot accommodating portion 12 to be accommodated in a slot of a stator core of a motor, a coil end portion 13 on a lead wire side, and a coil end portion 14 opposite to the lead wire. The conducting wire 11 in the slot accommodating portion 12 and the coil end portion 14 is wound forming a completely aligned winding, and intersection (transfer) of the conducting wire 11 is performed at the coil end portion 13.

Figure 2:
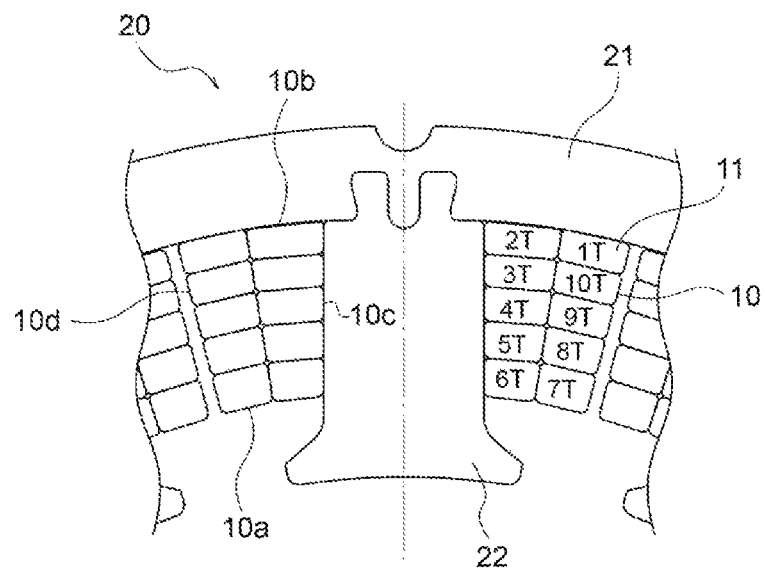
FIG. 2 is a diagram illustrating a cross-sectional shape of a coil.

FIG. 2 is a diagram illustrating a cross-sectional shape when the coil 10 is taken along a cutting plane A set in the slot accommodating portion 12. FIG. 2 illustrates the coil 10 used in an inner rotor type motor. The inner rotor type motor includes a shaft centered on a central axis extending in a predetermined direction (vertical direction), a rotor fixed to the shaft, and a stator disposed radially outside the rotor. The stator has an inner peripheral surface disposed radially facing a rotor magnet fixed to the shaft at an interval in the radial direction. The stator includes a stator core 20 and the coil 10. The stator core 20 includes a core back 21 in an annular shape and a plurality of teeth 22 projecting radially inward from the core back 21. The coil 10 is wound around the respective teeth 22. In FIG. 2, reference signs such as "1T" and "2T" given to the cross section of the conductive wire 11 indicate the winding order of the coil 10.

As illustrated in FIG. 2, in the stator slot, the coil 10 has a cross section in a sector shape (including a substantially sector shape). Here, the coil 10 in the slot may have a cross section in a sector shape formed of two concentric arcs 10a and 10b having different centers from that of the core back 21 of the stator, and straight lines 10c and 10d connecting ends of the respective two arcs. In this case, the straight line 10c connecting ends of the respective two arcs on a tooth 22 side extends along a shape of the tooth 22. That is, the conductive wire 11 is wound along a linear portion of the tooth 22. The conducting wire 11 has a cross section different in shape for each row. Specifically, the conducting wire 11 has a cross section in a trapezoidal shape with a height decreasing and a bottom side increasing in length, toward the row disposed in the outermost periphery in the radial direction of the motor. While a magnitude of an electric resistance value of the conducting wire 11 is determined in a part with the smallest cross-sectional area of the conducting wire 11, the conducting wire 11 in each row has the same cross-sectional area, and thus the electric resistance value in the conducting wire 11 can be constant.

The coil 10 described above achieves a high space factor, and can be formed by winding a composite trapezoidal wire. Here, the composite trapezoidal wire is a wire (conductive wire) having a plurality of trapezoidal cross sections different in dimension. FIG. 3A is a diagram illustrating an example of a composite trapezoidal wire. As illustrated in FIG. 3A, the conducting wire 11 being a composite trapezoidal wire has regions (leading wire portions) at its both ends, serving as coil lead wires. In a central portion sandwiched between the leading wire portions, a winding-corresponding region corresponding to a length of one turn of the coil 10 is formed continuously for the number of turns. Each of a plurality of the winding-corresponding regions has a cross section in a trapezoidal shape, and the trapezoidal shape is different in dimension for each winding corresponding region.

FIG. 3B illustrates a cross-sectional shape of a winding corresponding region (first trapezoidal portion) corresponding to 1T-th turn and 2T-th turn. FIG. 3C illustrates a cross-sectional shape of a winding corresponding region (second trapezoidal portion) corresponding to 3T-th turn and 10T-th turn. FIG. 3D illustrates a cross-sectional shape of a winding corresponding region (third trapezoidal portion) corresponding to 4T-th turn and 9T-th turn. FIG. 3E illustrates a cross-sectional shape of a winding corresponding region (fourth trapezoidal portion) corresponding to 5T-th turn and 8T-th turn. FIG. 3F illustrates a cross-sectional shape of a winding corresponding region (fifth trapezoidal portion) corresponding to 6T-th turn and 7T-th turn. FIGS. 3B to 3F each have the same contraction scale. As described above, the conducting wire 11 according to the present embodiment has trapezoidal cross sections of five patterns.

The leading wire portions each may have a cross section in any shape such as a circular shape or a rectangular shape. For example, the leading wire portions each may have a cross section in a shape of an element wire before being processed into a composite trapezoidal wire. As the element wire, for example, a round wire having a diameter of about 1 mm can be used. In addition, a total length of the conducting wire 11 can be appropriately set according to a slot shape of the stator, the number of turns of the coil 10, and the like. For example, when the coil 10 is a 10-turn coil disposed in a 12-slot stator, the conducting wire 11 can have a total length of about 780 mm. In addition, although not particularly illustrated, in a portion having a cross section in a shape gradually changing, such as a portion between each of the leading wire portions and the trapezoidal portions or a portion between the trapezoidal portions, a connection portion having a cross section in a shape gradually changing, and a length of about 1 mm to 2 mm, may be provided.

Next, a manufacturing method of the conducting wire 11 according to the present embodiment will be specifically described. The conducting wire 11 is manufactured using a forming apparatus that pressure forms an element wire 11A made of a round wire into a wire having a plurality of cross sections different in shape. FIG. 4 is a diagram illustrating schematic structure of a forming apparatus 200 for forming the conductive wire 11. The forming apparatus 200 includes a pair of V blocks 21 and 22 that can relatively move back and forth, and a plurality (four in the present embodiment) of split dies 23a to 23d. The pair of V blocks 21 and 22 is respectively disposed with V groove 21a and V groove 22a, facing each other. The four split dies 23a to 23d are disposed forming a forming space in which the element wire 11A is to be placed.

The four split dies 23a to 23d include the first split die 23a fixed to the V groove 21a of the V block 21, and the second split die 23b fixed to the V groove 22a of the V block 22. The third split die 23c is in sliding contact with the one surface of each of the V groove 21a and the V groove 22a, and the fourth split die 23d is in sliding contact with the other surface of each of the V groove 21a and the V groove 22a. Each of the V blocks 21 and 22 is fixed to a pressing machine (not illustrated), and is configured such that a pressing load is applied in a direction approaching each other in Z-direction. The forming apparatus 200 may include an insertion hole formed in a straight line in Z-direction in each of the V blocks 21 and 22, and a positioning pin inserted into the insertion hole for positioning the V blocks 21 and 22 in XY-direction.

A spacer 24 is provided between the V blocks 21 and 22. The spacer 24 is a restricting member that restricts movement of the V blocks 21 and 22 in the direction approaching each other to prevent the four split dies from coming into contact with each other. The spacer 24 is a flat plate member disposed between the V blocks 21 and 22, and is fixed to the V block 22. When the V blocks 21 and 22 move in the direction approaching each other and the V block 21 comes into contact with the spacer 24, movement of each of V blocks 21 and 22 in the direction approaching each other is restricted. The spacer 24 may be fixed to the V block 21.

The four split dies 23a to 23d each have a forming surface that forms a surface corresponds to one of four sides constituting a trapezoidal shape being a cross-sectional shape of the conducting wire 11. The forming surface of each of the four split dies 23a to 23d is a contact surface with the element wire 11A placed in the forming space, and has a shape changing in a longitudinal direction (X direction) of the element wire 11A.

Figure 5:
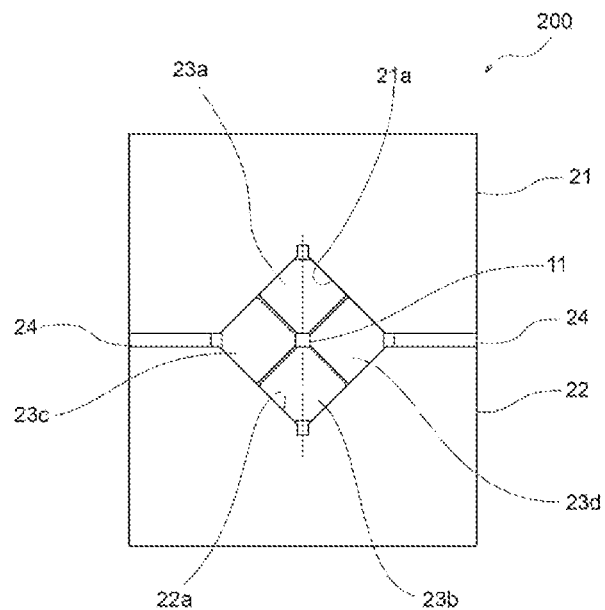
FIG. 5 is a diagram illustrating structure of a forming apparatus after a wire rod is processed.

For example, when the V block 22 is fixed and a press load is applied from above the V block 21 by the pressing machine, the first split die 23a fixed to the V block 21 moves downward in FIG. 4 to press an upper surface of the element wire 11A. The second split die 23b fixed to the V block 22 presses a lower surface of the element wire 11A. At this time, the third split die 23c slides in the V grooves 21a and 22a, and moves in a direction of pressing a left lateral surface of the element wire 11A. Similarly, the fourth split die 23d moves in a direction of pressing a right lateral surface of the element wire 11A. As described above, the press load from one direction enables the four split dies 23a to 23d to come into contact with the element wire 11A from the corresponding four directions to form the conductive wire 11 as illustrated in FIG. 5. At this time, the element wire 11A can be formed into the conducting wire 11 having a plurality of cross-sectional shapes different in X-direction using the forming surface of each of the four split dies 23a to 23d. That is, the conductive wire 11 having a plurality of trapezoidal cross sections different in X-direction can be formed in one step.

Figure 6:
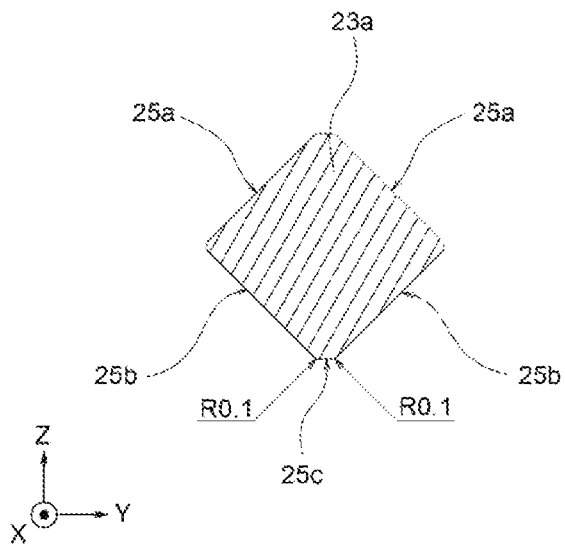
FIG. 6 illustrates an example of structure of a split die.

FIG. 6 is a diagram illustrating a specific structure of the first split die 23a. The second split die 23b to the fourth split die 23d each have the same structure as the first split die 23a, and thus the description thereof is eliminated here. In FIG. 6, the first split die 23a includes two surfaces 25a that are contact surfaces with the V groove 21a of the V block 21. The first split die 23a also includes two surfaces 25b that are opposing surfaces facing the corresponding third split die 23c and fourth split die 23d. Then, a surface 25c between the two surfaces 25b is a forming surface that comes into contact with the element wire 11A to form a surface corresponding to a side constituting a trapezoidal shape that is a cross-sectional shape of the conducting wire 11. The first split die 23a has a R chamfered portion (e.g., R=0.1 mm) at each of corners where the surfaces 25b facing the corresponding third split die 23c and fourth split die 23d adjacent to each other intersect the forming surface 25c that comes into contact with the element wire 11A.

Figures 7A, 7B:
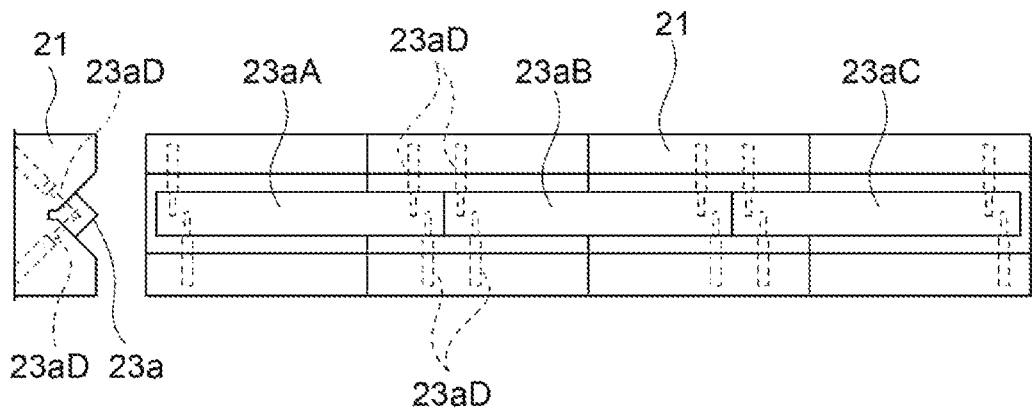
FIGS. 7A and 7B illustrate examples of a split die composed of a plurality of split die pieces.

The forming surface 25c of the first split die 23a may have a length equivalent to the entire length of the element wire 11A (conductive wire 11) in X-direction. Thus, to more accurately form the forming surface 25c, the first split die 23a may be composed of a plurality of split die pieces connected in a region where the first split die 23a changes in shape in X-direction. For example, as illustrated in FIGS. 7A and 7B, the first split die 23a may be composed of three split die pieces 23aA to 23aC. In this case, the split die pieces 23aA to 23aC may be screwed to the V block 21 with screws 23aD. For example, the screws 23aD may be used to connect both ends in X-direction of each of the split die pieces 23aA to 23aC to the V block 21 from two directions.

In addition, a connection position between the split die pieces is preferably set at a position corresponding to a region where a shape changes in the longitudinal direction of the element wire 11A, i.e., a portion between trapezoidal portions in the conducting wire 11, for example, where a cross-sectional shape changes. In addition, as illustrated in FIG. 7B, the V block 21 may be composed of a plurality of block pieces (four in FIG. 7B). In this case, each of the block pieces may be attached to a base member or the like (not illustrated) while being aligned in X-direction using a guide member (not illustrated). The second split type 23b and the V block 22 can be configured similarly.

The third split die 23c and the fourth split die 23d can also be composed of a plurality of split die pieces connected in X-direction. However, in the case of the third split die 23c and the fourth split die 23d, a connection method of screwing a die to a V block is not applicable unlike the first split die 23a and the second split die 23b. Thus, a method of independently connecting split die pieces is used for the third split die 23c and the fourth split die 23d. Examples of the method include a method of providing a hole extending in X-direction at an end of each of split die pieces, and inserting a pin into the hole to connect the split die pieces, and a method of providing steps at ends of respective split die pieces to screw the steps by overlapping the steps.

Figure 8:
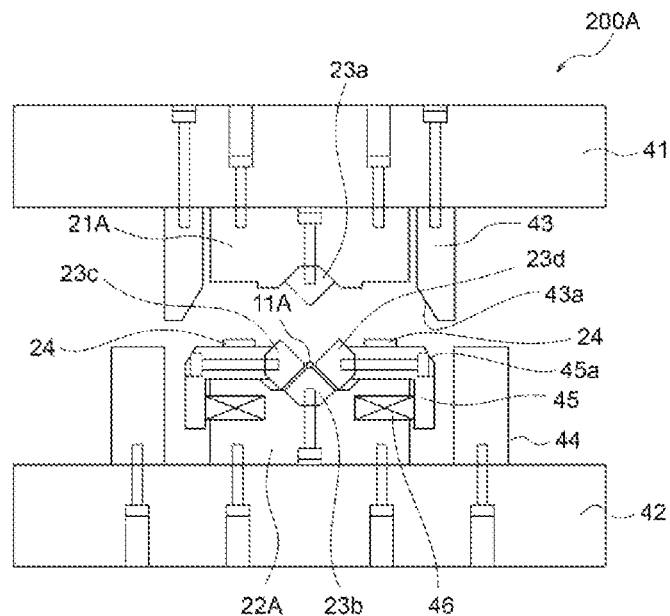
FIG. 8 is a diagram illustrating an example of structure of a forming apparatus including a biasing member.

The forming apparatus 200 may further include a biasing member that biases the third split die 23c and the fourth split die 23d in a direction of expanding the forming space. FIG. 8 is a diagram illustrating an example of structure of the forming apparatus 200A including a biasing member. In the forming apparatus 200A illustrated in FIG. 8, parts having the same structure as those of the forming apparatus 200 illustrated in FIGS. 4 and 5 described above are denoted by the same reference numerals as those in FIGS. 4 and 5, and parts different in structure will be mainly described below. The forming apparatus 200A includes a pair of V blocks 21A and 22A, four split dies 23a to 23d, and a spacer 24. Here, the V blocks 21A and 22A are respectively similar to the V blocks 21 and 22 in the forming apparatus 200 of FIGS. 4 and 5, except that surfaces facing each other are different is shape.

The forming apparatus 200A further includes an upper die back plate 41, a lower die back plate 42, a cam block 43, a side block 44, a cam slider 45, and a movable spring 46 as a biasing member. The V block 21A and the cam block 43 are fixed to a lower surface of the upper die back plate 41, and the V block 22A and the side block 44 are fixed to an upper surface of the lower die back plate 42. A first split die 23a is fixed to the V block 21A, and a second split die 23b is fixed to the V block 22A.

The cam slider 45 is fixed to a third split die 23c and a fourth split die 23d, and is configured to be slidable on the V block 22A. A spacer 24 is provided on a surface of the cam slider 45, facing the V block 21A. The movable spring 46 is connected at one end to the V block 22A, and at the other end to the cam slider 45. The movable spring 46 biases the third split die 23c and the fourth split die 23d using the cam slider 45 in a direction of expanding a forming space. The cam slider 45 further includes a cam surface 45a. The cam surface 45a can be engaged with a cam surface 43a provided on the cam block 43.

Figure 9:
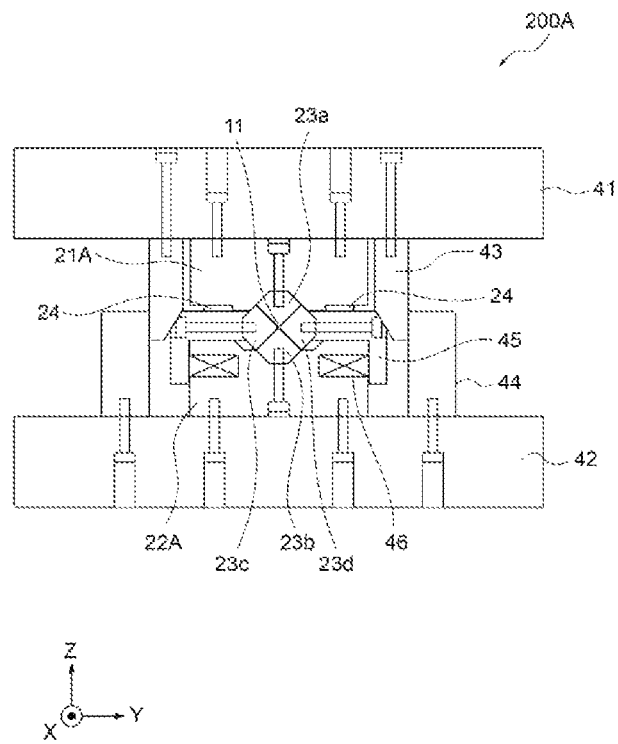
FIG. 9 is a diagram illustrating an example of structure of a forming apparatus including a biasing member.

The structure described above causes the cam surface 43a provided on the cam block 43 to come into contact with the cam surface 45a provided on the cam slider 45 when the V block 21A descends and the pair of V blocks 21A and 22A moves in a direction approaching each other. In this state, when the V block 21A further descends, the cam slider 45 moves in a direction in which the third split die 23c and the fourth split die 23d approach each other with the cam surface 43a and the cam surface 45a engaged with each other. This enables the four split dies 23a to 23d to come into contact with the element wire 11A from four directions, so that the conductive wire 11 can be formed as illustrated in FIG. 9.

After the conductive wire 11 is formed, raising the V block 21A enables the third split die 23c and the fourth split die 23d to be moved in a direction away from each other using biasing force of the movable spring 46 in conjunction with the movement of the V block 21A. This facilitates taking out the conducting wire 11 after forming.

The forming apparatus 200A enables the V block 21A to have a moving speed different from a moving speed of the cam slider 45 by appropriately setting inclination angles of the cam surface 43a and the cam surface 45a. That is, the first split die 23a can have a moving speed different from moving speeds of the third split die 23c and the fourth split die 23d. This enables adjusting timing of bringing a forming surface of each of the split dies into contact with the wire 11A, so that the conductive wire 11 having a desired cross-sectional shape can be accurately formed. Accordingly, at least two or more dies to be moved of the plurality of split dies 23a to 23d may be configured such that each of the dies to be moved, is moved in a direction of narrowing the forming space at a different speed.

As described above, in a pressure forming step of the present embodiment, a press load is applied from one direction to place the element wire 11A in a forming space surrounded by a plurality of split dies, and then at least one of the plurality of split dies is moved in a direction of narrowing the forming space to pressure-form the element wire 11A into the conducting wire 11 having a plurality of trapezoidal cross sections different in dimension in its longitudinal direction. Accordingly, in the present embodiment, the composite trapezoidal wire can be accurately formed by forming using a plurality of split dies each having a surface changing in the longitudinal direction of the element wire 11A. Thus, a coil achieving a high space factor can be manufactured by using this composite trapezoidal wire.

The four split dies 23a to 23d have respective forming surfaces changing in the longitudinal direction of the element wire 11A. In the forming step of the conducting wire 11, the forming surfaces form respective surfaces corresponding to four sides constituting a trapezoidal shape being a cross-sectional shape of the conducting wire 11. Thus, the conductive wire 11 has a formed surface that is a highly accurate surface with no step. The conducting wire 11 also can have a cross-sectional shape of a trapezoidal shape having sharp corners (e.g., about R=0.1 mm). As described above, the wire 11A in the present embodiment is a round wire having a diameter of about 1 mm, and it is desirable that the composite trapezoidal wire has a corner with R of about 0.1 mm to achieve a high space factor of a coil. In the present embodiment, the composite trapezoidal wire having a desired cross-sectional shape can be formed with high accuracy.

In this forming step, the element wire 11A can be subjected to equal pressure with each of the four split dies 23a to 23d. In addition, in this forming process, one conducting wire 11 can be formed at a high speed. For example, to form a conducting wire using a reduction roll, it is difficult to apply equal pressure to the element wire 11A from four directions with four reduction rolls. In addition, each reduction roll is required to change its position in a portion where the conducting wire changes in cross-sectional shape, so that a tact time for manufacturing one conducting wire increases to deteriorate productivity.

In contrast, the four split dies 23a to 23d are used in the present embodiment, so that the conducting wire 11 having a plurality of different cross-sectional shapes in its longitudinal direction can be manufactured with high accuracy. In the present embodiment, control of a reduction roll interval as described above is unnecessary. This enables a tact time required for manufacturing one conducting wire 11 to be shortened to improve productivity.

The forming apparatus 200 used in the forming step includes a pressing machine (not illustrated) serving as a moving mechanism that moves the pair of V blocks 21 and 22, the four split dies 23a to 23d, and the four split dies 23a to 23d in the direction of narrowing the forming space. The four split dies 23a to 23d each have a contact surface with the element wire 11A, the contact surface having a shape changing in the longitudinal direction of the element wire 11A. The first split die 23a is fixed to the V groove 21a of the V block 21, and the second split die 23b is fixed to the V groove 22a of the V block 22. The third split die 23c is in sliding contact with the one surface of each of the V groove 21a and the V groove 22a, and the fourth split die 23d is in sliding contact with the other surface of each of the V groove 21a and the V groove 22a.

The structure described above enables the four split dies 23a to 23d to be moved in a direction of narrowing the forming space when the V blocks 21 and 22 are moved in a direction of approaching each other, in conjunction with the movement of the V blocks 21 and 22. That is, a press load from one direction enables the four split dies 23a to 23d to come into contact with the element wire 11A from four respective directions. Here, the four split dies 23a to 23d each have a surface changing in the longitudinal direction of the element wire 11A. Thus, the conducting wire 11 having a plurality of cross-sectional shapes (trapezoidal shapes) can be appropriately formed in one step. In addition, the four split dies 23a to 23d can be disposed using the V grooves 21a and 22a of the V blocks 21 and 22 as reference planes, so that the conducting wire 11 can be formed with high accuracy.

As described above, the forming apparatus 200 in the present embodiment can achieve an operation in which the four surfaces for forming the trapezoidal shape being the cross-sectional shape of the conducting wire 11 are gradually closed in conjunction with each other. Thus, a desired trapezoidal cross section can be accurately formed. Besides a flat trapezoid having a height less a length of a bottom side as illustrated in each of FIGS. 3A to 3F, a vertically long trapezoid having a height more than a length of a bottom side also can be formed. The forming apparatus 200 in the present embodiment also can simultaneously form a plurality of trapezoidal shapes different in dimension including joints thereof. Thus, the composite trapezoidal wire can be manufactured at a higher speed.

The forming apparatus 200 also includes the spacer 24 serving as a restricting member that restricts movement of the pair of V blocks 21 and 22 in the direction of approaching each other, so that the pair of V blocks 21 and 22 also can be prevented from approaching each other beyond a predetermined interval. This enables preventing the split dies moved in the direction of narrowing the forming space from coming into contact with each other. The split dies moved in the direction of narrowing the forming space have a minimum approach distance therebetween of 50 μm, for example. As a result, a tolerance of each of surfaces of the split dies, facing each other, can be moderated. In addition, unintended contact between the split dies causing an undesired gap between the other split dies can be suppressed, so that a conducting wire having a desired cross-sectional shape can be accurately formed.

In addition, as illustrated in FIG. 6, each of the four split dies 23a to 23d also may have an R chamfered portion at each of corners where the surfaces facing the corresponding split dies adjacent to each other intersect the forming surface that comes into contact with the element wire 11A. This enables preventing the element wires 11A from coming into contact with the corner of the split die and being damaged or cut when the split die moves in the direction of narrowing the forming space. As illustrated in FIGS. 7A and 7B, the four split dies 23a to 23d each may be composed of a plurality of split die pieces connected in a region where the corresponding one of the split dies changes in shape in the longitudinal direction of the element wire 11A. Structure with a plurality of split die pieces aligned and joined in the longitudinal direction of the element wire 11A as described above enables even a relatively long element wire 11A to be accurately formed into the conducting wire 11 having a desired cross-sectional shape. In addition, connecting the split die pieces to each other in a region where the corresponding one of the split die pieces changes in shape in the longitudinal direction of the element wire 11A enables each of the trapezoidal portion, the second trapezoidal portion, . . . , and the like in FIGS. 3A to 3F to have an uniform cross-sectional shape, so that the conducting wire 11 having a desired cross-sectional shape can be accurately formed.

Like the forming apparatus 200A illustrated in FIGS. 8 and 9, the movable spring 46 serving as a biasing member that biases the third split die 23c and the fourth split die 23d in the direction of expanding the forming space may be provided. In this case, after the conductive wire 11 is formed, moving the pair of V blocks 21A and 22A in a direction away from each other enables the third split die 23c and the fourth split die 23d to be moved in a direction away from each other using the movable spring 46 in conjunction with the movement of the V blocks 21A and 22A. This facilitates taking out the conducting wire 11 after forming.

Figures 10A, 10B:
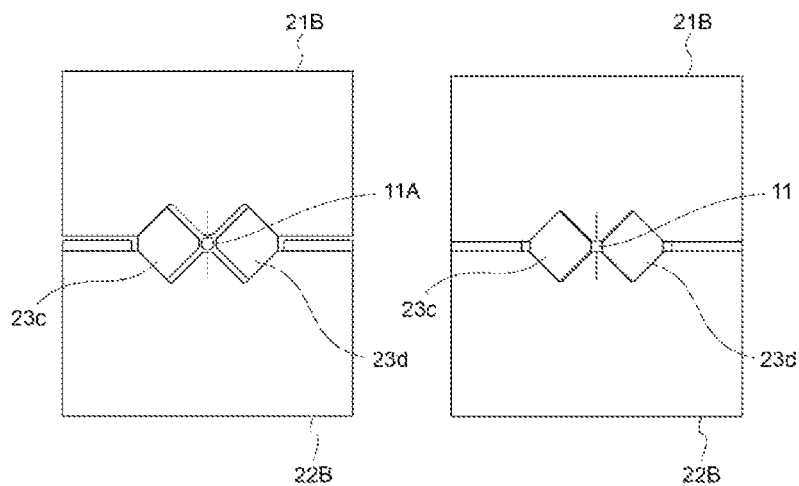
FIGS. 10A and 10B are diagrams illustrating another example of a forming apparatus.

In the above embodiment, the first split die 23a of the forming apparatus 200 may be integrally formed with the V block 21. Similarly, the second split die 23b may be integrally formed with the V block 22. That is, as illustrated in FIG. 10A, the element wire 11A may be pressure-formed with a block 21A having a shape in which the first split die 23a and the V block 21 are integrally formed, a block 22B having a shape in which the second split die 23b and the V block 22 are integrally formed, the third split die 23c, and the fourth split die 23d. In this case, moving the pair of blocks 21A and 22A in a direction of approaching each other enables moving the third split die 23c and the fourth split die 23d in a direction of approaching each other as illustrated in FIG. 10B. Thus, the conductive wire 11 can be appropriately formed as in the above embodiment. As described above, when the first split die 23a and the V block 21, as well as the second split die 23b and the V block 22 are integrally formed, displacement between the split dies and the corresponding V blocks caused by influence of temperature change or the like, for example, can be prevented. This enables the conducting wire 11 having a desired cross-sectional shape to be accurately formed.

While in the above embodiment, the forming apparatus 200 including a pair of V blocks and four split dies is described, the forming apparatus 200 is not limited to the configuration described above. The forming apparatus 200 may include a plurality of split dies disposed forming a forming space in which the element wire 11A is placed, and a moving mechanism that moves at least one of the plurality of split dies in a direction of narrowing the forming space. For example, the forming apparatus 200 may include a pair of split dies that can relatively move back and forth, and at least one of the pair of split dies may be configured to be disassembled into a plurality of parts. That is, the forming apparatus 200 may be configured to be able to form the conducting wire 11 having a desired cross-sectional shape and to easily remove the conducting wire 11 after forming from the split die.

The composite trapezoidal line is not limited to the shapes illustrated in FIGS. 3A to 3F. For example, each winding-corresponding region may include a first region having a trapezoidal cross section and a second region having a rectangular cross section. Here, the first region corresponds to the slot accommodating portion 12 of the coil 10, and the second region corresponds to the coil end portions 13 and 14 of the coil 10. The rectangular shape in the second area can be the same shape in each winding-corresponding region. In this case, the coil end portions 13 and 14 each have a coil cross section having a rectangular shape. Forming each of the coil end portions 13 and 14 to have a rectangular cross-sectional shape has a merit of enabling suppressing a height of each of the coil end portions and of causing the coil 11 to be easily formed because the conductive wire 11 is less likely to be tilted during winding.

Figure 11:
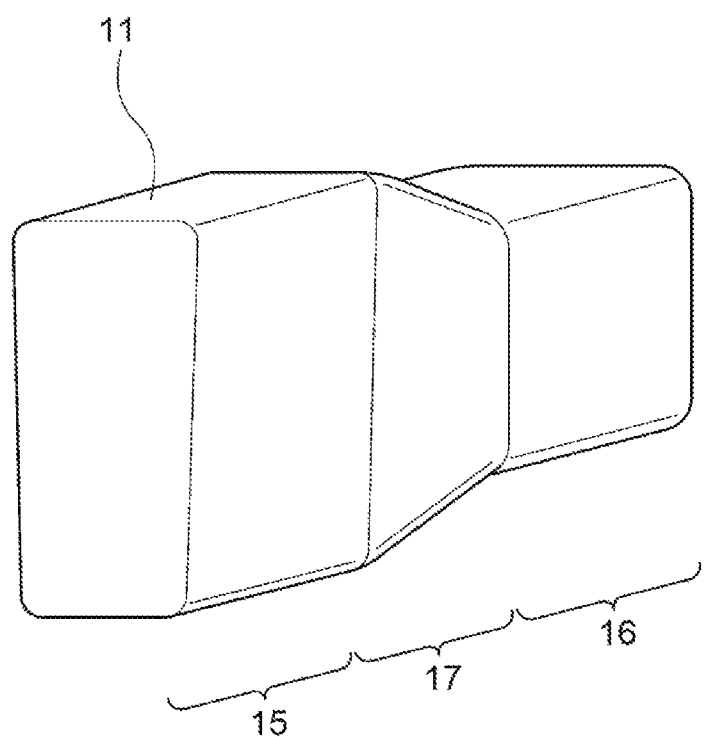
FIG. 11 illustrating another example of a wire rod constituting a coil.

The composite trapezoidal wire described above includes a portion 15 having a trapezoidal cross section, a portion 16 having a rectangular cross section, and a portion 17 having a cross section gradually changing in shape from a trapezoidal shape to a rectangular shape, as partially illustrated in FIG. 11. For example, when the coil 10 has five rows as illustrated in FIG. 1, the element wire 11A may be processed with seven patterns of five types of trapezoidal portion, a rectangular portion, and a portion changing in shape from a trapezoid to a rectangle. Even the conductive wire 11 having a complicated cross-sectional shape as described above can be manufactured with high accuracy by the above-described manufacturing method.

The invention claimed is:

1. A manufacturing method to manufacture a wire rod for forming a coil, the manufacturing method comprising the steps of:
   placing an element wire in a forming space surrounded by a plurality of split dies; and
   pressure-forming the element wire by moving the plurality of split dies in a direction of narrowing the forming space,
   in the step of pressure-forming,
      at least one of the plurality of split dies being moved,
      the plurality of split dies each having a surface that changes in shape in a longitudinal direction of the element wire to pressure-form the element wire into the wire rod having a plurality of different cross-sectional shapes in the longitudinal direction, and
      the plurality of split dies include at least two or more dies to be moved, and the at least two or more dies are each moved in the direction of narrowing the forming space at a different speed.

2. The manufacturing method according to claim 1, wherein
   in the step of pressure-forming, the element wire is press-formed into the wire rod having a plurality of trapezoidal cross sections different in dimension in the longitudinal direction.

3. The manufacturing method according to claim 2, wherein
   in the step of pressure-forming, four split dies are used as the plurality of split dies, and
   the four split dies have respective forming surfaces that change in shape in the longitudinal direction of the element wire, and the forming surfaces form surfaces corresponding to respective four sides constituting the trapezoidal shape.

4. The manufacturing method according to claim 1, wherein
   in the step of pressure-forming, a press load is applied from one direction to move at least one of the plurality of split dies in the direction of narrowing the forming space.

5. A wire rod manufactured by the manufacturing method according to claim 1, the wire rod comprising:
   a plurality of winding-corresponding regions corresponding to a length of one turn of the coil,
   the plurality of winding-corresponding regions each including a first region having a trapezoidal cross section, and
   the trapezoidal shape in the first region being different in dimension for each of the plurality of winding-corresponding regions.

6. The wire rod according to claim 5, wherein
   each of the plurality of winding-corresponding regions includes the first region and a second region having a rectangular cross section, and
   the rectangular shape in the second region is the same shape in each of the plurality of winding-corresponding regions.

7. A motor comprising:
   a shaft centered on a central axis extending in a predetermined direction;
   a rotor fixed to the shaft; and
   a stator,
   the stator including:
      an annular core back;
      a tooth projecting radially from the core back; and
      a coil wound around the tooth, the coil being formed of the wire rod according to claim 5.

8. A manufacturing apparatus configured to manufacture a wire rod for forming a coil, the manufacturing apparatus comprising:
   a plurality of split dies disposed forming a forming space in which an element wire is disposed;
   a moving mechanism that moves at least one of the plurality of split dies in a direction of narrowing the forming space, the plurality of split dies each having a contact surface with the element wire, the contact surface having a shape that changes in a longitudinal direction of the element wire; and
   a pair of V blocks that is relatively movable back and forth, and that includes respective V grooves facing each other,
   the plurality of split dies including:
      a first split die fixed to the V groove of one of the pair of V blocks,
      a second split die fixed to the V groove of the other of the pair of V blocks,
      a third split die in sliding contact with one surface of each of the V grooves of the pair of V blocks, and
      a fourth split die in sliding contact with the other surface of each of the V grooves of the pair of V blocks.

9. The manufacturing apparatus according to claim 8, wherein
   said one of the pair of V blocks and the first split die are integrally formed, and
   the other of the pair of V blocks and the second split die are integrally formed.

10. The manufacturing apparatus according to claim 8, further comprising:
   a biasing member that biases the third split die and the fourth split die in a direction of expanding the forming space.

11. The manufacturing apparatus according to claim 8, further comprising:
   a restricting member that restricts movement of the pair of V blocks in a direction of approaching each other.

12. The manufacturing apparatus according to claim 8, wherein
   the plurality of split dies each have a surface changing in shape in the longitudinal direction of the element wire, the surface serving as a forming surface that forms a surface corresponds to one of four sides constituting a trapezoidal shape being a cross-sectional shape of the wire rod, and
   the plurality of split dies each have an R chamfered portion at each of corners where surfaces facing corresponding split dies adjacent to each other intersect the forming surface.

13. The manufacturing apparatus according to claim 8, wherein
   at least one of the plurality of split dies is configured to be disassembled into a plurality of parts.

14. The manufacturing apparatus according to claim 8 wherein
   each split die among the plurality of split dies is composed of a plurality of split die pieces connected in a region where said each split die changes in shape in the longitudinal direction of the element wire.

* * * * *